United States Patent Office

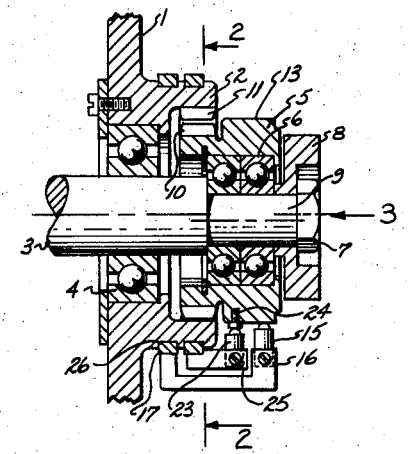

3,147,425
Patented Sept. 1, 1964

3,147,425
PULSE GENERATOR
Chris A. Christoff, San Gabriel, Calif., assignor to Clary Corporation, San Gabriel, Calif., a corporation of California
Filed Oct. 30, 1961, Ser. No. 148,567
9 Claims. (Cl. 323—90)

This invention relates to pulse generators for generating pulses in time with rotary equipment, such as may be desired for timing or clocking purposes. Such pulse generators are used for a variety of purposes, for example, to time components of electronic data processing systems, to index electrically operated counters, etc.

Heretofore, high speed pulse generators of the above type have generally embodied so-called reluctance or inductive pickup coils which are placed in close proximity to the path of a set of regularly spaced teeth or holes formed in a rotating element of magnetic material. As the teeth move past the pickup coil, they vary the inductance or reluctance of such coil and thereby generate pulses or electrical energy variations in a control circuit connected to the coil.

Although such devices are usually satisfactory, the teeth are generally carried on a member which is rotating at a constant rate and therefore the teeth pass the pickup coil at a constant rate of speed only. Accordingly, only one type of pulse wave form is generated. Also, such teeth must be accurately spaced in order to generate equally spaced pulses.

A principal object of the present invention is to generate pulses by a peculiar movement of a moving member rather than by teeth or the like formed on such member.

Another object is to cause a rotating device to generate regularly recurring pulses without the use of regularly spaced teeth, contacts or the like spaced therearound.

A further object is to cause a rotating device to generate different types of wave forms or configurations of current variations or voltage in a circuit controlled thereby.

The manner in which the above and other objects of the invention are accomplished will be readily understood on reference to the following specification when read in conjunction with the accompanying drawings, wherein:

FIG. 1 is a sectional view through a pulse generator embodying a preferred form of the present invention.

FIG. 2 is a transverse sectional view through the pulse generator and is taken along the line 2—2 of FIG. 1.

FIG. 3 is an end view of the pulse generator and is taken in the direction of the arrow 3 in FIG. 1.

FIG. 4 is a schematic view illustrating the path of movement taken by a point on the periphery of the pulse generating wheel.

FIG. 5 is a sectional view, with parts broken away, illustrating a modified form of a pulse generator.

FIG. 6 is a side view, partly in section, of another modified form of pulse generating wheel.

FIG. 7 is a schematic view illustrating different curves described by points on different diameters of the pulse generating wheel of FIG. 6.

Referring to FIGS. 1 to 4 in particular, the pulse generator disclosed therein comprises a frame 1 having a counterbored hub 2 in which a rotatable shaft 3 is mounted through a ball bearing 4.

The shaft has an eccentric portion 9 which rotatably supports a pulse generating wheel 5 through ball bearings 6. The bearings are retained against axial movement relative to the shaft by a nut 7 which is threaded onto the outer end of the eccentric portion and is effective to retain a counterbalance disc 8 fixed to the shaft. The counterbalance disc is arranged concentric with the shaft 3 proper.

The wheel 5 which is preferably of steel or other ferrous material has an external spur gear 10 integral therewith and concentric with the eccentric shaft portion 9, the gear 10 meshing with an internal gear 11 formed integral with the hub 2. The gear 11 is concentric with the shaft 3 proper.

Accordingly, when the shaft is rotated by a suitable drive means (not shown), the wheel 5 will be moved in an orbital path about the center of the shaft. Since the pitch circle of the external gear is smaller than that of the internal gear, the wheel 5 will creep in a direction reverse to the direction of movement of the shaft and at a rate equal to the ratio between the diameters of the pitch circles of the internal and external gears. This movement of the wheel 5 will cause a point on the pitch circle of the external gear to describe a hypocycloidal path similar to that shown at 12 in FIG. 7.

It will be noted that the outer cylindrical periphery 13 of the wheel 5 is somewhat larger in diameter than the pitch circle of gear 10. Accordingly, a point $a$ (FIG. 4) on such periphery 13 will describe a curtate form of hypocycloidal curve as depicted at 14.

An electrical transducer or voltage control device 15 is located directly adjacent the periphery 13 of the wheel and is mounted in a holder 16 integral with a split ring 17. The latter is rotatably mounted in a groove formed in the hub 2 concentric with the shaft 3. A clamp screw similar to the screw 18 (FIG. 2) is passed through one leg of the ring and is threaded into the other to locate the holder 16 and device 15 in different adjusted positions about the wheel.

The transducer 15 may be of any suitable type adapted to effect a pulse or voltage variation upon movement into close proximity with the periphery of the wheel 5. Preferably such a transducer is of the inductive or reluctance type wherein a magnetic core diagrammatically illustrated at 20 (FIG. 4) is located directly adjacent the periphery 13 of the wheel and has a coil 21 wound thereon and connected to an amplifier circuit 22 for actuating an electrically operable counter or the like (not shown).

Now, as the shaft 3 moves through a complete revolution, the periphery 13 of the wheel 5 will move toward and away from close proximity to the device 15 as a point on the periphery describes one segment of the curve 14, causing the same to generate a pulse in the circuit 22.

A second transducer 23 is located in the path of a ferrous metal pin 24 secured to the periphery of the wheel 5. The device 23 is carried in a second holder 25 mounted on a split ring 26 which extends alongside ring 17 and permits angular adjustment of the transducer 23 relative to the transducer 15.

The transducer 23 is spaced closely adjacent the head of the pin 24 when the latter is directly opposite the same so as to cause the transducer to generate a pulse as the pin moves therepast. However, since the transducer is spaced appreciably from the periphery of the wheel 5, the periphery will be ineffective in itself to generate a pulse. Therefore, if, for example, the external gear 10 has 22 teeth thereon which mesh with 24 teeth on the internal gear 11, the pin will, due to the creeping action of the wheel, pass the transducer 23 once every 11 revolutions of the shaft 3 and accordingly will cause the transducer to generate a pulse during every 11th revolution of the shaft.

The holders 16 and 25 may be adjusted to any angular positions relative to each other and to the internal gear 11 so as to change the phase relationship between the generated pulses and the position of the shaft 3 as desired.

FIG. 5 illustrates a modified form of the invention wherein a pulse generating wheel 5a is provided with a thin annular flange 126. A transducer device 27 similar to transducers 15 and 23 is mounted on a holder 28 which is adjustably mounted in a second holder 30 formed integral with a split ring 31. For this purpose, the holder 28 has a shank 32 which is slideably fitted in a bearing formed in the holder 30 and is retained in any desired setting radially of the axis of shaft 3a by a set screw 33.

The flange 126 is depicted as being of the same diameter as the pitch circle of the external gear 10a so that a point thereon will describe a pure hypocycloidal path as the shaft is rotated. Accordingly, the transducer may be adjusted radially of the shaft 3a to sense any portion of the curve described by a point on such flange. Thus, the wave form of the resulting pulses will vary depending on the adjusted position of the transducer. It will be noted that the flange could be made of any desired diameter to thereby generate different curves and accordingly produce different output wave forms.

FIG. 6 illustrates another modified form of the invention in which the pulse generating wheel 5b is provided with three concentric peripheral sections 34, 35 and 36. The section 35 is of the same diameter as the pitch circle of the gear 10 which is integral therewith. The section 34 is of a smaller diameter than such pitch circle and the section 36 is of a larger diameter. Accordingly, a point on the periphery of section 34 will describe a prolate form of hypocycloidal curve shown at 37 in FIG. 7 while a point on the periphery of section 36 will describe a curtate form of hypocycloidal curve indicated at 38 in FIG. 7. Therefore, three different forms of pulse wave forms will be generated by different transducers associated with the respective ones of the sections.

In lieu of the reluctance and inductive type transducers or pulse generating devices disclosed hereinabove, other types of transducers may be controlled by the pulse generating wheel, i.e., 5, such as crystal actuated circuit controls, contact switches, photoelectric controls, magnetic pickups, etc. In such cases, the pulse generating wheel, i.e., 5, may be formed of any desirable material, such as plastic. Since different types of transducers produce different output wave forms, it will be seen that a wide variety of pulse wave forms may be obtained, in accordance with the present invention, by proper selection of transducer and proper positioning of such transducer to sense an appropriate diameter of pulse generating wheel or flange thereon.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. In a pulse generator, a stationary internal gear, a member having a circular periphery, an external gear integral with said member, said external gear having a smaller pitch circle than the pitch circle of said internal gear, means for moving the center of said member in a circular orbit whereby to maintain said gears in mesh and to cause a point on said periphery to describe at least substantially a hypocycloidal curve, a stationary transducer device cooperable with said member, and a circuit operatively connected to said device, said device being effective to cause electrical energy variations in said circuit in accordance with the movement of said periphery of said member relative to said device.

2. In a pulse generator, a stationary internal gear, a rotatable member, said member having a peripheral portion concentric with its center, an external gear integral with said member, said external gear having a smaller pitch circle than that of said internal gear, means for moving the center of said member in a circular orbit whereby to maintain said gears in mesh, and a stationary transducer device cooperable with said member, said transducer device being effective to cause electrical energy variations in accordance with the movement of said peripheral portion relative thereto.

3. A pulse generator comprising a stationary internal gear, a rotatable member, said member having a peripheral portion concentric with its center, an external gear integral with said member, said external gear having a smaller pitch circle than that of said internal gear, means for moving the center of said member in a circular orbit whereby to maintain said gears in mesh, and a stationary pulse generating device cooperable with said member, said pulse generating device being effective to generate a pulse upon movement of said peripheral portion adjacent thereto, and said peripheral portion being of smaller diameter than the diameter of said pitch circle of said external gear whereby a point on said peripheral portion describes a prolate form of hypocycloidal curve upon movement of said member.

4. A pulse generator comprising a fixed internal gear, a rotatable member, said member having a peripheral portion concentric with its center, an external gear integral with said member, said external gear having a smaller pitch circle than that of said internal gear, means for moving the center of said member in a circular orbit whereby to maintain said gears in mesh, and a fixed pulse generating device cooperable with said member, said pulse generating device being effective to generate a pulse upon movement of said peripheral portion adjacent thereto, and said peripheral portion being of larger diameter than the diameter of said pitch circle of said external gear whereby a point on said peripheral portion describes a curtate form of hypocycloidal curve upon movement of said member.

5. A pulse generator comprising a pair of intermeshing internal and external gears, means fixedly supporting a first one of said gears, means for moving the other of said gears in a circular orbit whereby to maintain said gears in mesh, a member having a circular periphery integral with said movable gear and concentric therewith, a pulse generating device, and means fixedly supporting said pulse generating device relative to said first gear, said pulse generating device being effective to generate a pulse upon movement of the periphery of said member adjacent thereto.

6. A pulse generator in accordance with claim 5 comprising means for selectively locating said pulse generating device in different positions about said first gear.

7. A pulse generator comprising a pair of intermeshing internal and external gear members, means fixedly supporting a first one of said gear members, means for moving the other of said gear members in a circular orbit whereby to maintain said gears in mesh, said other gear member having a projection thereon, a pulse generator, and means fixedly supporting said pulse generator relative to said first gear member, said pulse generator being effective to generate a pulse upon movement of said projection adjacent thereto.

8. In a pulse generator, a pair of internal and external gear members, said external gear member having a smaller pitch circle than the pitch circle of said internal gear, means fixedly supporting a first one of said gear members, means for moving the other of said gear members in a circular orbit whereby to maintain said gears in mesh and to cause a point on said other gear member to describe a hypocycloidal curve, said other gear member having a projection thereon, and a transducer cooperable with said projection, said projection being movable into and out of proximity to said transducer, and said transducer being effective to cause electrical energy variations upon movement of said projection into proximity thereto.

9. A pulse generator comprising a member having a generally cylindrical opening, a member having a generally cylindrical outer periphery extending within said opening, means fixedly supporting a first one of said members, means for moving the second one of said members in a circular orbit whereby to maintain said members in rolling engagement, a pulse generating device, and means fixedly supporting said pulse generating device relative to said first member, said pulse generating device being effective to generate a pulse upon movement of said periphery of said second member adjacent thereto.

References Cited in the file of this patent

UNITED STATES PATENTS 2,810,844    Morrill ---------------- Oct. 22, 1957
3,056,914    Potter ----------------- Oct. 2, 1962